US011784737B2

United States Patent
Petro et al.

(10) Patent No.: US 11,784,737 B2
(45) Date of Patent: *Oct. 10, 2023

(54) METHODS AND APPARATUS FOR OPTIMIZING STATION REFERENCE FINGERPRINT LOADING USING REFERENCE WATERMARKS

(71) Applicant: The Nielsen Company (US), LLC, New York, NY (US)

(72) Inventors: James Petro, Dunedin, FL (US); Dan Nelson, Tampa, FL (US); Deborah Cross, Troy, AL (US); Raghuram Ranganathan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,453

(22) Filed: Sep. 28, 2022

(65) Prior Publication Data

US 2023/0089158 A1 Mar. 23, 2023

Related U.S. Application Data

(63) Continuation of application No. 17/121,303, filed on Dec. 14, 2020, now Pat. No. 11,469,841, which is a
(Continued)

(51) Int. Cl.
*H04H 60/40* (2008.01)
*H04H 60/37* (2008.01)
(Continued)

(52) U.S. Cl.
CPC ............ *H04H 60/40* (2013.01); *H04H 60/37* (2013.01); *H04H 60/58* (2013.01); *H04H 60/59* (2013.01);
(Continued)

(58) Field of Classification Search
CPC ........ H04H 60/37; H04H 60/40; H04H 60/58; H04H 60/59; H04N 21/4394; H04N 21/44008
See application file for complete search history.

(56) References Cited

U.S. PATENT DOCUMENTS

| 4,230,990 A | 10/1980 | Lert, Jr. et al. |
| 5,481,294 A | 1/1996 | Thomas et al. |
(Continued)

FOREIGN PATENT DOCUMENTS

KR 10-1442017 B1 9/2014

OTHER PUBLICATIONS

International Searching Authority: "International Search Report," dated Apr. 17, 2020 in connection with International Patent Application No. PCT/US2019/066605, 3 pages.
(Continued)

*Primary Examiner* — Michael B. Pierorazio (57) ABSTRACT

Methods, apparatus, systems and articles of manufacture are disclosed selectively generating and storing hashed reference signatures. An example method disclosed herein determining whether watermark coverage of a first media segment satisfies a dropout constraint, the first media segment corresponding to a first monitoring time interval of a media source feed and, when the watermark coverage of the first media segment does not satisfy the dropout constraint hashing first media signatures associated with the first media segment to generate corresponding first hashed signatures and generating first reference data for the first media segment, the first reference data including the first hashed signatures and the first media signatures. The example method further includes, when the watermark coverage of the first media segment satisfies the dropout constraint, generating second reference data for the first media segment,
(Continued)

the second reference data including the first media signatures.

21 Claims, 6 Drawing Sheets

Related U.S. Application Data continuation of application No. 16/232,509, filed on Dec. 26, 2018, now Pat. No. 10,868,620.

(51) Int. Cl.
*H04N 21/44* (2011.01)
*H04H 60/59* (2008.01)
*H04N 21/439* (2011.01)
*H04H 60/58* (2008.01)

(52) U.S. Cl.
CPC ... *H04N 21/4394* (2013.01); *H04N 21/44008* (2013.01)

(56) References Cited

U.S. PATENT DOCUMENTS

| | | | | |
|---|---|---|---|---|
| 6,570,996 | B1* | 5/2003 | Linnartz | H04N 1/00037 725/20 |
| 6,889,325 | B1* | 5/2005 | Sipman | H04L 63/126 380/37 |
| 7,168,083 | B2 | 1/2007 | Kalker et al. | |
| 7,818,577 | B2 | 10/2010 | David et al. | |
| 8,190,435 | B2* | 5/2012 | Li-Chun Wang | G10L 15/26 704/270 |
| 8,290,423 | B2* | 10/2012 | Wang | H04B 17/23 455/2.01 |
| 8,300,884 | B2 | 10/2012 | Sharma | |
| 8,650,603 | B2* | 2/2014 | Doets | H04N 21/25891 725/38 |
| 8,688,600 | B2* | 4/2014 | Barton | G06Q 30/0601 84/603 |
| 8,725,829 | B2* | 5/2014 | Wang | G06Q 30/06 704/239 |
| 8,811,885 | B2* | 8/2014 | Wang | H04H 60/44 455/2.01 |
| 9,195,663 | B2 | 11/2015 | Ramanathan et al. | |
| 10,863,236 | B2* | 12/2020 | Petro | H04N 21/8456 |
| 10,868,620 | B2 | 12/2020 | Petro et al. | |
| 2002/0072982 | A1* | 6/2002 | Barton | G06Q 30/0625 705/14.1 |
| 2002/0083060 | A1* | 6/2002 | Wang | G11B 27/28 |
| 2002/0126872 | A1 | 9/2002 | Brunk et al. | |
| 2004/0199387 | A1* | 10/2004 | Wang | G06Q 30/06 704/E15.045 |
| 2005/0028195 | A1* | 2/2005 | Feinleib | H04N 7/163 725/135 |
| 2005/0091274 | A1* | 4/2005 | Stanford | G06F 16/9577 |
| 2005/0192863 | A1* | 9/2005 | Mohan | G06Q 30/02 705/14.27 |
| 2005/0209917 | A1* | 9/2005 | Anderson | G06Q 30/0214 705/14.16 |
| 2006/0195359 | A1* | 8/2006 | Robinson | G06Q 30/0236 705/14.19 |
| 2006/0224452 | A1* | 10/2006 | Ng | G06Q 30/0226 705/14.27 |
| 2006/0256133 | A1* | 11/2006 | Rosenberg | G06F 3/013 345/619 |
| 2007/0124756 | A1* | 5/2007 | Covell | G06F 16/635 348/E7.071 |
| 2007/0130580 | A1* | 6/2007 | Covell | G11B 27/034 725/18 |
| 2007/0143778 | A1* | 6/2007 | Covell | H04N 21/8133 725/135 |
| 2007/0179850 | A1* | 8/2007 | Ganjon | G06Q 30/0236 705/14.27 |
| 2007/0192784 | A1* | 8/2007 | Postrel | H04N 21/4316 725/23 |
| 2007/0214049 | A1* | 9/2007 | Postrel | H04N 21/475 725/32 |
| 2008/0052062 | A1* | 2/2008 | Stanford | G10L 15/26 704/E15.045 |
| 2009/0198701 | A1* | 8/2009 | Haileselassie | G06F 16/9535 |
| 2009/0313670 | A1* | 12/2009 | Takao | H04N 21/47 725/110 |
| 2010/0034466 | A1* | 2/2010 | Jing | G06F 18/214 382/195 |
| 2010/0114713 | A1* | 5/2010 | Anderson | G06Q 20/10 705/14.69 |
| 2011/0273455 | A1* | 11/2011 | Powar | G11B 27/10 345/473 |
| 2012/0011545 | A1* | 1/2012 | Doets | H04N 21/8153 725/38 |
| 2012/0076310 | A1* | 3/2012 | DeBusk | G10L 25/48 381/56 |
| 2012/0117596 | A1* | 5/2012 | Mountain | H04N 21/4147 725/39 |
| 2012/0124608 | A1* | 5/2012 | Postrel | G06Q 30/0215 725/23 |
| 2012/0191231 | A1* | 7/2012 | Wang | G06F 16/7834 700/94 |
| 2012/0221131 | A1* | 8/2012 | Wang | G06F 16/634 700/94 |
| 2012/0295560 | A1* | 11/2012 | Mufti | H04B 13/00 455/95 |
| 2012/0297400 | A1* | 11/2012 | Hill | G06F 9/445 719/318 |
| 2012/0316969 | A1* | 12/2012 | Metcalf, III | G06Q 30/0269 705/14.66 |
| 2012/0317240 | A1* | 12/2012 | Wang | H04H 60/37 709/219 |
| 2013/0010204 | A1* | 1/2013 | Wang | H04H 20/88 348/725 |
| 2013/0029762 | A1* | 1/2013 | Klappert | A63F 13/792 463/31 |
| 2013/0031579 | A1* | 1/2013 | Klappert | H04N 21/454 725/32 |
| 2013/0042262 | A1* | 2/2013 | Riethmueller | H04N 21/25866 725/14 |
| 2013/0044051 | A1* | 2/2013 | Jeong | H04N 21/44218 345/156 |
| 2013/0067512 | A1* | 3/2013 | Dion | G06Q 30/0251 725/32 |
| 2013/0073366 | A1* | 3/2013 | Heath | G06Q 30/0261 705/14.25 |
| 2013/0073377 | A1* | 3/2013 | Heath | G06Q 30/02 705/14.39 |
| 2013/0080242 | A1* | 3/2013 | Alhadeff | G06F 16/957 705/14.39 |
| 2013/0080262 | A1* | 3/2013 | Scott | G06Q 30/02 705/14.68 |
| 2013/0085828 | A1* | 4/2013 | Schuster | G06Q 30/0207 705/14.39 |
| 2013/0111519 | A1* | 5/2013 | Rice | G06Q 30/02 725/34 |
| 2013/0124073 | A1* | 5/2013 | Ren | G08G 1/00 701/118 |
| 2013/0308818 | A1 | 11/2013 | Macintosh et al. | |
| 2014/0137139 | A1* | 5/2014 | Jones | H04N 21/4394 725/18 |
| 2014/0214532 | A1* | 7/2014 | Barton | G06Q 30/0251 705/26.62 |
| 2014/0237499 | A1 | 8/2014 | Falcon | |
| 2014/0278845 | A1* | 9/2014 | Teiser | H04N 21/812 705/14.4 |
| 2014/0282671 | A1* | 9/2014 | McMillan | H04N 21/44213 725/19 |
| 2015/0128180 | A1* | 5/2015 | Mountain | H04N 21/64322 725/39 |
| 2015/0229979 | A1* | 8/2015 | Wood | H04N 21/4663 725/14 |

(56) References Cited

U.S. PATENT DOCUMENTS

| | | | |
|---|---|---|---|
| 2015/0237389 A1* | 8/2015 | Grout | H04N 21/2665 725/49 |
| 2015/0289013 A1 | 10/2015 | Nelson et al. | |
| 2016/0057490 A1* | 2/2016 | Besehanic | H04N 21/44213 725/19 |
| 2016/0127793 A1* | 5/2016 | Grout | H04N 21/4668 725/46 |
| 2016/0165287 A1* | 6/2016 | Wood | H04N 21/44222 725/14 |
| 2016/0182973 A1* | 6/2016 | Winograd | H04N 21/8358 725/25 |
| 2016/0323650 A1* | 11/2016 | Grout | H04N 21/26283 |
| 2017/0068671 A1 | 3/2017 | Ramanathan et al. | |
| 2017/0078727 A1* | 3/2017 | Wood | H04N 21/44222 |
| 2017/0324995 A1* | 11/2017 | Grout | H04N 21/23424 |
| 2018/0165286 A1 | 6/2018 | Ranganathan et al. | |
| 2018/0262805 A1* | 9/2018 | Grout | H04N 21/4532 |

OTHER PUBLICATIONS

International Searching Authority: "Written Opinion," dated Apr. 17, 2020 in connection with International Patent Application No. PCT/US2019/066605, 4 pages.

United States Patent and Trademark Office: "Notice of Allowance and Fee(s) Due," mailed in connection with U.S. Appl. No. 16/232,509, dated Aug. 4, 2020, 7 pages.

United States Patent and Trademark Office: "Non-Final Rejection," issued in connection with U.S. Appl. No. 16/232,509, dated Feb. 5, 2020, 12 pages.

International Searching Authority: "International Preliminary Report on Patentability," dated Jun. 16, 2021, in connection with International Patent Application No. PCT/US2019/066605, 6 pages.

United States Patent and Trademark Office, "Non-Final Office Action," issued in connection with U.S. Appl. No. 17/121,303, dated Jul. 2, 2021, 23 pages.

United States Patent and Trademark Office, "Final Office Action," issued in connection with U.S. Appl. No. 17/121,303, dated Feb. 22, 2022, 13 pages.

United States Patent and Trademark Office, "Notice of Allowance and Fee(s) Due," issued in connection with U.S. Appl. No. 17/121,303, dated May 12, 2022, 7 pages.

United States Patent and Trademark Office, "Notice of Allowance and Fee(s) Due," issued in connection with U.S. Appl. No. 17/121,303, dated Jun. 7, 2022, 7 pages.

United States Patent and Trademark Office, "Corrected Notice of Allowability," issued in connection with U.S. Appl. No. 16/232,509, dated Nov. 12, 2020, 2 pages.

* cited by examiner

FIG. 6

METHODS AND APPARATUS FOR OPTIMIZING STATION REFERENCE FINGERPRINT LOADING USING REFERENCE WATERMARKS

RELATED APPLICATION

This patent is a continuation of U.S. application Ser. No. 17/121,303, filed on Dec. 14, 2020, entitled "METHODS AND APPARATUS FOR OPTIMIZING STATION REFERENCE FINGERPRINT LOADING USING REFERENCE WATERMARKS, which is a continuation of U.S. patent application Ser. No. 16/232,509, filed Dec. 26, 2018, entitled "METHODS AND APPARATUS FOR OPTIMIZING STATION REFERENCE FINGERPRINT LOADING USING REFERENCE WATERMARKS." Priority to U.S. patent application Ser. No. 17/121,303 and U.S. patent application Ser. No. 16/232,509 is claimed. U.S. patent application Ser. No. 17/121,303 and U.S. patent application Ser. No. 16/232,509 are hereby incorporated by reference herein in their entireties.

FIELD OF THE DISCLOSURE

This disclosure relates generally to media identification systems, and, more particularly, to methods and apparatus for optimizing station reference fingerprint loading using reference watermarks.

BACKGROUND

Some media includes embedded watermarks that allow subsequent detection of the media by decoding the watermarks in the presented media. For example, a broadcasting entity (e.g., a radio broadcaster, a television broadcaster, an internet streamer, etc.) may encode watermarks into media signals. A media monitoring entity may then detect the watermarks in the media signals during monitoring activities and accurately determine, based on identification information associated with the watermark, that the media (e.g., a television show, a film, a commercial etc.) corresponding to the media signals was presented to a user.

Additionally or alternatively, a media monitoring entity can also generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provide can provide a different watermark for each media source feed.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Media monitoring entities generate media reference databases that include audio unhashed signatures, hashed signatures and watermarks. Generated signatures can be processed using a hashing algorithm to expedite the signature matching process. However, hashing a signature requires a significant amount of computing resources. As used herein, the terms "unhashed" and "linear" are used interchangeably and refer to audio signatures that are not hashed. The generated references allow a central facility of the media monitoring company to determine the identity of the media associated with monitoring data gathered from a media meter. For example, a media monitoring company can gather media identification data from a media meter and compare it to the generated references to credit a user with exposure to that media. Monitored media can be credited using one, or a combination, of watermarks, unhashed signatures, and hashed signatures.

In some examples, media monitoring companies store generated reference databases on cloud storage services (e.g., Amazon Web Services, etc.). To allow the crediting of time-shifted viewing (e.g., viewing media via a digital video recorder (DVR), etc.), the stored references are retained in memory for a period time after the initial presentation of the media. Additionally, if a person is viewing content via an on-demand service, if the references associated with the media are still available for crediting on the reference database, using unhashed and hashed signatures can result in the viewership being incorrectly credited as time-shifted viewing.

Methods and apparatus are disclosed herein enable the optimization of the generation of media identification reference by selectively generating and storing hashed reference signatures. An example method disclosed herein determines whether watermark coverage of a first media segment satisfies a dropout constraint, the first media segment corresponding to a first monitoring time interval of a media source feed. When the watermark coverage of the first media segment does not satisfy the dropout constraint, the example method includes hashing first media signatures associated with the first media segment to generate corresponding first hashed signatures and generating first reference data for the first media segment, the first reference data including the first hashed signatures and the first media signatures. The example method further includes, when the watermark coverage of the first media segment does satisfy the dropout constraint, generating second reference data for the first media segment, the second reference data including the first media signatures.

Figure 1:
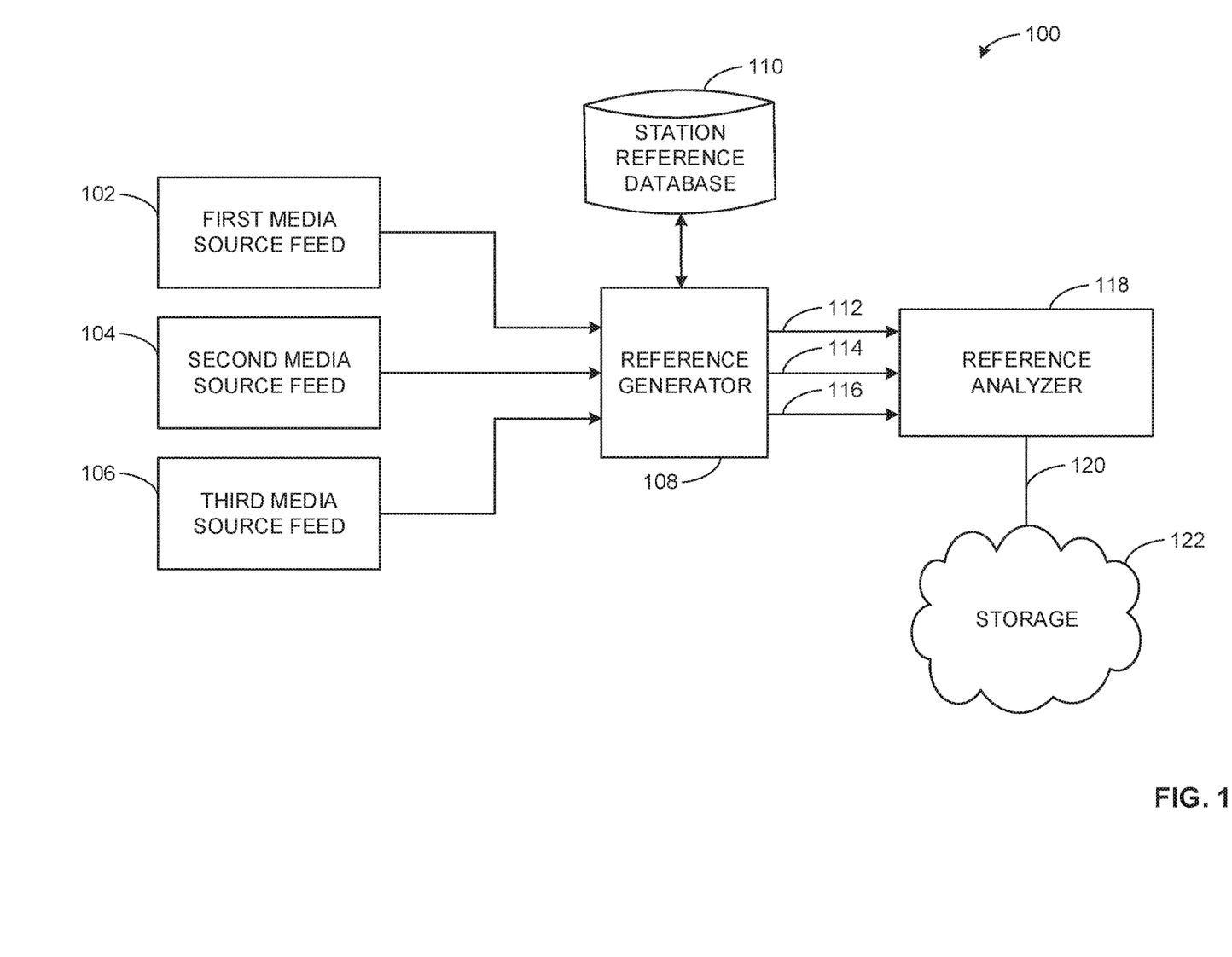
FIG. 1 is a block diagram of an example environment in which the teachings of this disclosure may be implemented

FIG. 1 is a block diagram of an example system 100 in which the teachings of this disclosure may be implemented. The example system 100 includes an example first media source feed 102, an example second media source feed 104 and an example third media source feed 106. An example reference generator 108 receives input from the media source feeds 102, 104, 106 and outputs generated an example watermark reference 112, an example time reference 114 and an example signature reference 116 to an example reference analyzer 118. In the illustrated example of FIG. 1, the reference analyzer 118 receives input from an example station reference database 110 and outputs an example stored reference 120 to an example storage 122.

The example first media source feed 102, the example second media source feed 104 and the example third media source feed 106 are sources of media associated with a media provider. In some examples, the media source feeds 102, 104, 106 are monitored television feeds associated with a television provider. For example, the first media source feed 102, the second media source feed 104 and third media source feed 106 can include television feeds (e.g., ESPN, CNN, TNT, etc.) that present continuous media. In other examples, the media source feeds 102, 104, 106 can be associated with any suitable type of media and/or media provider (e.g., a radio feed, a streaming service feed, etc.). In some examples, the media source feeds 102, 104, 106 are presented to the reference generator 108 live. In other examples, some or all of the media source feeds 102, 104, 106 can be presented to the reference generator 108 after the original broadcast of the media source feeds 102, 104, 106.

In the illustrated example, the first media source feed 102 only includes media that is watermarked. In the illustrated example, the second media source feed 104 includes media that is watermarked and media that is not watermarked. For example, the second media source feed 104 can include watermarked media (e.g., a sitcom, a sports broadcast) and unwatermarked media (e.g., unwatermarked advertisements, etc.). In the illustrated example, the third media source feed 106 includes no media that is watermarked. For example, the media provider associated with the third media source feed 106 could not collaborate with a media monitoring entity (e.g., CSPAN, etc.). In other examples, the media associated with the media source feeds 102, 104, 106 can be any combination of watermarked and unwatermarked.

The example reference generator 108 monitors the example media source feed 102, the example media source feed 104, and/or the example media source feed 106. The example reference generator 108 processes the media source feeds 102, 104, 106 to generate reference signatures and/or watermarks. For example, the reference generator 108 can detect watermarks within the media source feeds and associate detected with the media source feed within a certain time set. Additionally or alternatively, the example reference generator 108 can process the media source feeds 102, 104, 106 to create signatures of the media associated with the media source feeds 102, 104, 106 in a given time period.

The example station reference database 110 contains associations between watermarks provided to media providers and the stations feeds that are encoded with the provided watermarks. In some examples, the reference generator 108 can communicate with the station reference database 110 to determine if a media source feed has watermarks.

The example reference analyzer 118 receives the generated reference data (e.g., generated reference watermarks, generated reference signatures, etc.) associated with each media source feeds 102, 104, 106. The example reference analyzer 118 can analyze the received reference data to determine what media segments of the media source feeds 102, 104, 106 have watermark coverage (e.g., the media source feed is encoded with watermarks in that media segment, etc.). For example, the reference analyzer 118 can divide the example second media source feed 104 into media segments (e.g., one minute segments, etc.) and determine if each media segment has a watermark reference segment associated with it. In some examples, when a media segment does not have watermark coverage, the reference analyzer 118 can hash the reference signatures associated with that media segment and store them in the example storage 122. In some examples, when a media segment has watermark coverage, the reference analyzer 118 does not hash reference signatures associated with the media segment. The example reference analyzer 118 generates a stored reference 120 which can include reference watermarks, reference unhashed signatures and/or reference hashed signatures. An example implementation of the reference analyzer 118 is described below in connection with FIG. 2.

The example storage 122 is a database of stored reference data (e.g., including the example reference 120, etc.) associated with the media source feeds 102, 104, 106. In some examples, the storage 122 is implemented as cloud storage. For example, the storage 122 can be implemented by a cloud service (e.g., AWS, etc.). Additionally or alternatively, the reference analyzer 118 can be implemented via the cloud service. In other examples, the storage 122 can be implemented as physical storage at a central facility of the audience measurement entity. The reference data stored in the example storage 122 can be used to match monitored media data to a media source feed and credit media impressions.

Figure 2:
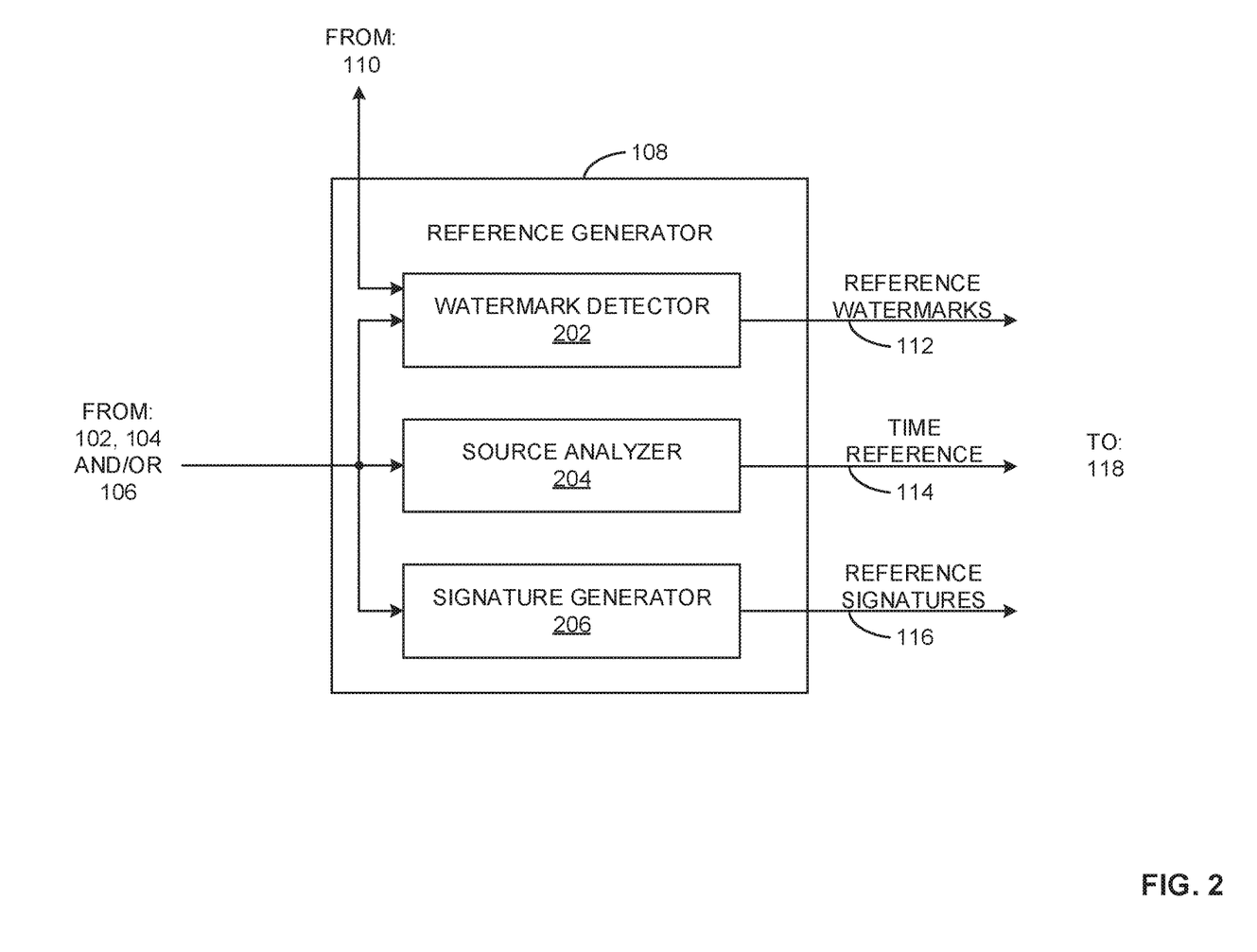
FIG. 2 is a block diagram of an implementation of the reference generator of FIG. 1.

FIG. 2 is a block diagram of an implementation of the reference generator 108 of FIG. 1. The example reference generator 108 includes an example watermark detector 202, an example source analyzer 204, and an example signature generator 206. The example reference generator receives input from one or more of the example media source feeds 102, 104, 106 and outputs the example watermark reference 112, the time reference 114, and the reference signatures 116. In some examples, the reference generator 108 can be implemented as media monitoring station (MMS) of an audience measurement entity.

The example watermark detector 202 analyzes a media source feed to detect watermarks encoded therein. For example, the watermark detector 202 extracts watermarks encoded with a media source feed and creates the example associated watermark reference 112 based on the extracted watermarks. In some examples, the watermark detector 202 can further associate the watermarks of the watermark reference 112 with a timestamp within media source feed. In some examples, the generated watermark reference 112 indicates the originating media source feed of the associated media. In some examples, the watermark detector 202 can extract and/or generate the watermark reference 112 based on metadata associated with a media source.

The example source analyzer 204 creates the example time reference 114. For example, the source analyzer 204 can create timestamps based on media source feed. In some examples, the source analyzer 204 can extract timestamps from the watermarks associated with the media source feed. In some examples, the signature analyzer 204 can extract and/or generate the time reference 114 based on metadata associated with a media source.

The example signature generator 206 analyzes a media source feed to determine the signature reference 116 of the media signal associated with the media source feed. For example, the signature generator 206 can extract audio extrema from the media signal to create a signature. In other examples, the signature generator 206 can generate the signature reference 116 via any suitable method (e.g., extracting the audio signatures, etc.). In some examples, the signature generator 206 can extract and/or generate the signature reference 116 based on metadata associated with a media source.

Figure 3:
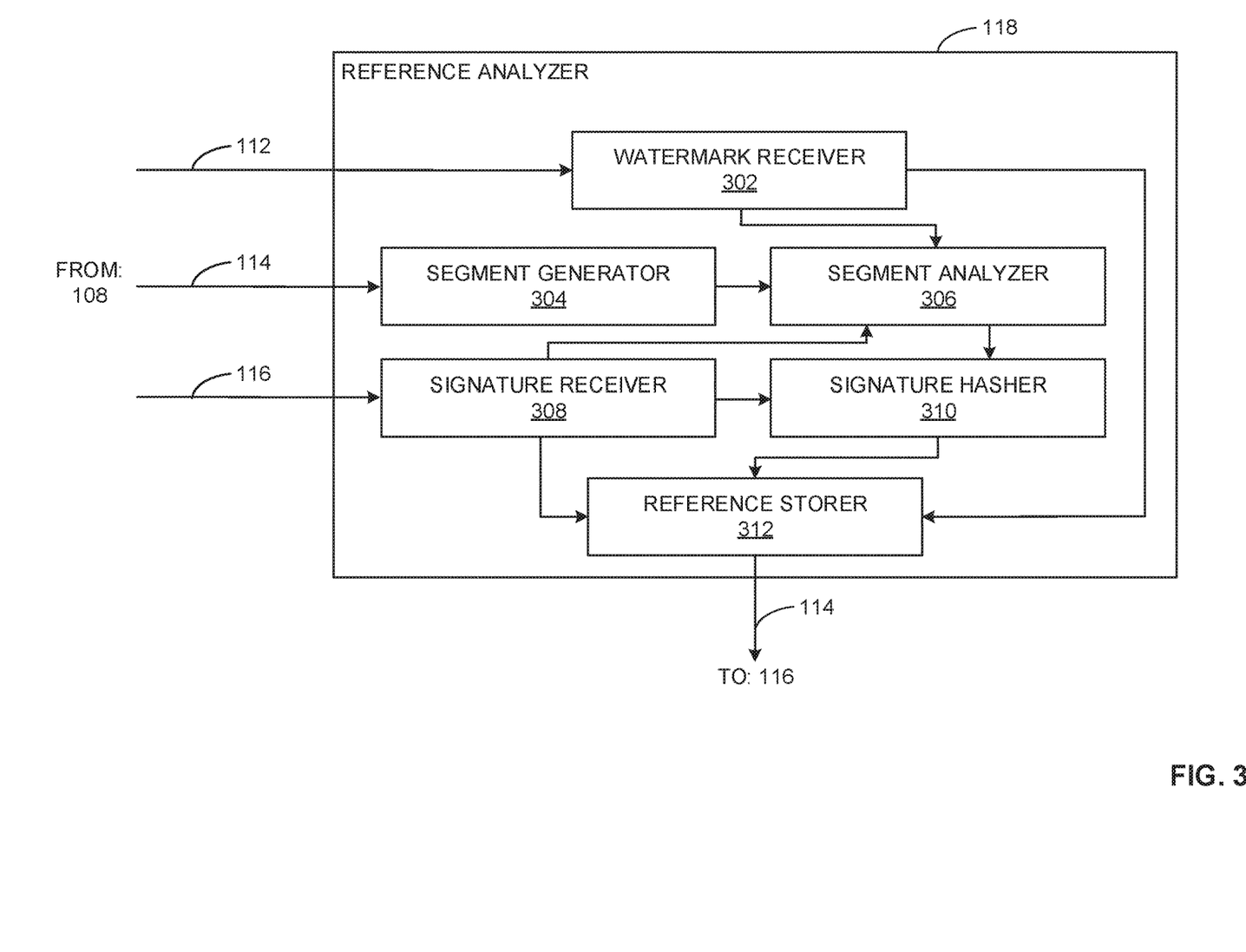
FIG. 3 is a block diagram of an implementation of the reference analyzer of FIG. 1.

FIG. 3 is a block diagram of an implementation of the reference analyzer 118 of FIG. 1. The example reference analyzer 118 receives input from the example reference generator 108 and outputs an example reference 120. The example reference analyzer 118 includes an example watermark receiver 302, an example segment generator 304, an example segment analyzer 306, an example signature receiver 308, an example signature hasher 310 and example reference storer 312. The example watermark receiver 302 receives watermark references from the example reference generator 108.

The example segment generator 304 divides a media source feed into discrete media segments. For example, the segment generator 304 can divide a media source feed into non-overlapping segments of a predetermined length, such as, one minute long segments. In other examples, the segment generator 304 can segment a media source feed into a media segment of any other suitable length (e.g., thirty seconds, five seconds, five minutes, etc.).

The example segment analyzer 306 analyzes the segmented media source feeds to determine if a media segment has enough watermark coverage to allow the identification of media segment using the watermark reference 112. For example, the segment analyzer 306 can determine the watermark coverage of a media segment satisfies a dropout constraint. As used herein, the term "dropout constraint" refers to the amount of watermark coverage associated with a media segment that would allow consistent identification of the media segment using encoded watermarks. In some examples, the dropout constraint can be a percentage of the media segment (e.g., if more than 10% of the media segment does not have watermark coverage, the dropout constraint is not satisfied, etc.). In other examples, the dropout constraint can be a duration of time without watermarks in the media segment (e.g., if more than 5 seconds of media segment does not have watermark coverage, the dropout constraint is not satisfied, etc.). In some examples, the dropout constraint can depend upon the frequency of watermark encoding. In some examples, the segment analyzer 306 can determine if watermarks of the watermark reference 112 associated with the media segment satisfy the dropout constraint. In other examples, the segment analyzer 306 can query the station reference database 110 to determine if a media provider has been provided a watermark to encode the media associated with the media segment.

The example signature receiver 308 receives the signature reference 116 from the example reference generator 108. In some examples, the signature receiver 308 can receive the signature reference 116 associated with a media segment prior to receiving the watermark references. In this example, the signature receiver 308 can move the received signature reference 116 into a staging area until the associated watermark references are received. In some examples, if there is not a watermark reference associated with the media segment (e.g., the media segment is from the first media source feed 102), the signature reference 116 could be released from the staging area after a threshold amount of time.

The example signature hasher 310 hashes the unhashed reference signatures into hashed signatures. For example, the signature hasher 310 can process a reference signature associated with the signature reference with an algorithm to generate a corresponding hashed signature. The generated hashed signature can be used to expedite the matching of media data signatures to reference signatures. However, the operation of the signature hasher 310 is computationally extensive. Accordingly, if the media segment has watermark coverage allowing the matching to occur with encoded watermarks in the media segment, reference signature(s) associated with that media segment are not hashed.

The example reference storer 312 generates the stored reference 120 based on the output of the example segment analyzer 306, the example signature hasher and/or the watermark receiver 302. For example, if the media segment has watermark coverage, the reference storer 312 generates the stored reference 120 that includes reference watermarks associated with the media segment and reference signatures associated with the media segments. In other examples, if the media segment does not have watermark coverage, the reference storer 312 generates a stored reference 120 that includes reference hashed signatures and reference unhashed signatures.

While an example manner of implementing the reference analyzer 118 of FIG. 1 is illustrated in FIG. 2, one or more of the elements, processes and/or devices illustrated in FIG. 2 may be combined, divided, re-arranged, omitted, eliminated and/or implemented in any other way. Further, the example watermark receiver 302, the example segment generator 304, the example segment analyzer 306, the example signature 308, the example signature hasher 310, the example segment reference storer 312 and/or, more generally, the example reference analyzer 118 of FIG. 2 may be implemented by hardware, software, firmware and/or any combination of hardware, software and/or firmware. Thus, for example, any of the example watermark receiver 302, the example segment generator 304, the example segment analyzer 306, the example signature 308, the example signature hasher 310, the example segment reference storer 312 and/or, more generally, the example reference analyzer 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark receiver 302, the example segment generator 304, the example segment analyzer 306, the example signature 308, the example signature hasher 310, the example segment reference storer 312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example reference analyzer 118 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4A:
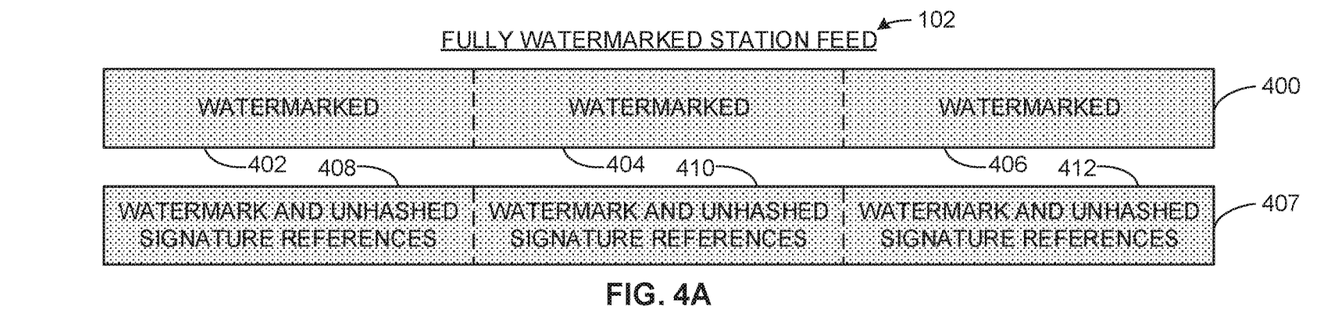
FIGS. 4A-4C illustrated example outputs of the reference analyzer of FIG. 3 based on input from media source feeds of FIG. 1.

FIG. 4A illustrates an example output of the reference analyzer 118 of FIG. 2 based on input from the example media source feed 102 of FIG. 1. In the illustrated example, the first media source feed 102 includes an example portion 400. The example portion 400 can be processed by the reference analyzer 118 to generate an example reference 407. The example portion 400 includes an example first media segment 402, an example second media segment 404 and an example third segment 406 which are associated with an example first reference segment 408, an example second reference segment 410 and an example third reference segment 412, respectively.

In the illustrated example, the portion 400 can be of any suitable length of time. In some examples, the segment generator 304 of FIG. 2 divides the portion 400 into the media segments 402, 404, 406 of an equal predetermined length. For example, if the portion 400 is three minutes long, the segment generator 304 can divide the portion 400 into media segments 402, 404, 406 that are one minute long. In other examples, the portion 400 and media segments 402, 404, 406 can be of any suitable length. In some examples, the media segments 402, 404, 406 can be overlapping. For example, the beginning of the second media segment 404 can overlap with the end of the first media segment 402, etc.

Prior to being analyzed by the reference analyzer 118, each watermark in the portion 400 of the media source feed 102 is detected by the reference generator 108. In some examples, the reference generator 108 detects the encoded watermarks and identifies the watermarks as reference watermarks associated with the portion 400. Additionally, in some examples, the reference generator 108 similarly processes the portion 400 of the media source feed 102 to create reference signatures associated with each media segment 402, 404, 406. In the illustrated example, the reference generator 108 creates at least one reference watermark associated with each of the media segments 402, 404, 406 because the media source feed 102 is completely watermarked. In some examples, the segment analyzer 306 determines that each media segment 402, 404, 406 has watermark coverage. Accordingly, the reference storer 312 generates the reference segments 408, 410, 412, which each include the reference watermarks and the unhashed signature references created by the reference generator 108. In some examples, the reference generator 108 outputs the example reference 407, which includes the reference segments 408, 410, 412 and corresponds with the portion 400.

Figure 4B:
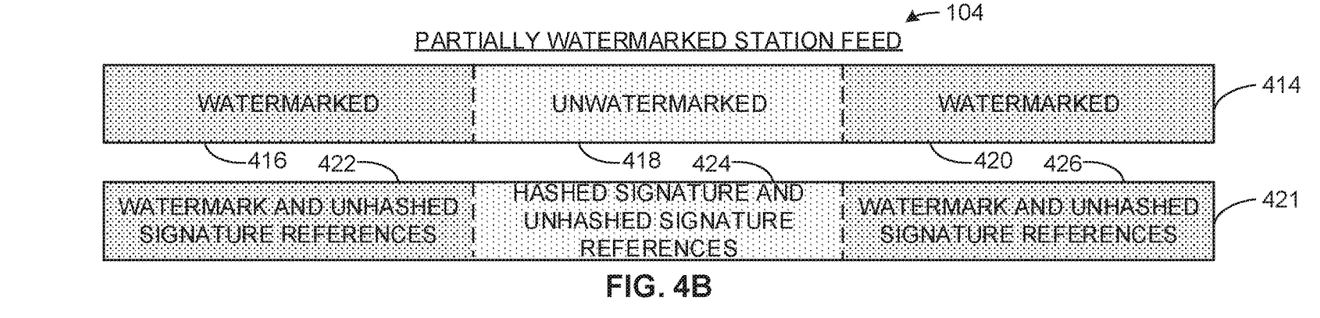

FIG. 4B illustrates an example output of the reference analyzer 118 of FIG. 2 based on input from the example second media source feed 104 of FIG. 1. The second media source feed 104 includes an example portion 414. The example portion 414 can be processed by the reference analyzer 118 to generate an example reference 421. The example portion 414 includes an example first media segment 416, an example second media segment 418 and an example third media segment 420 which are associated with an example first reference segment 422, an example second reference segment 424 and an example third reference segment 426, respectively.

In the illustrated example, the portion 414 can be of any suitable length of time. In some examples, the segment generator 304 of FIG. 2 divides the portion 414 into the media segments 416, 418, 420 of an equal predetermined length. For example, if the portion 414 is three minutes long, the segment generator 304 can divide the portion 414 into media segments 416, 418, 420 that are one minute long. In other examples, the portion 414 and media segments 416, 418, 420 can be of any suitable length. In some examples, the media segments 416, 418, 420 can be overlapping. For example, the beginning of the second media segment 418 can overlap with the end of the first media segment 416, etc.

Prior to being analyzed by the reference analyzer 118, each watermark in the portion 414 of the partially media source feed 104 is detected by the reference generator 108. In some examples, the reference generator 108 detects the encoded watermarks and indicates the watermarks as reference watermarks associated with the portion 414. Additionally, in some examples, the reference generator 108 similarly processes the portion 400 of the second media source feed 104 to created reference signatures associated with each media segment 416, 418, 420. In the illustrated example, the reference generator 108 creates at least one watermark reference associated with the first media segments 416 and at least one watermark reference associated with the third media segment 420. However, the media associated with the second media segment 418 is not encoded with watermarks. Accordingly, the reference generator 108 does not create reference watermark reference(s) associated with the second media segment 418.

In some examples, the segment analyzer 306 determines that each media segment 416, 420 has watermark coverage and that the second media segment 418 does not have watermark coverage. Accordingly, the reference storer 312 generates the reference segments 422, 426 which both include the reference watermarks and the unhashed signature references created by the reference generator 108. In some examples, because the second media segment 418 does not have watermark coverage, the signature hasher 310 hashes the reference signatures associated with the second media segment 418. In this example, the reference storer 312 generates the reference segment 424 which includes the unhashed signature references and the hashed reference signatures. In some examples, the reference generator 108 outputs the example reference 421 which includes the reference segments 436, 438, 440 and corresponds to the portion 414.

Figure 4C:
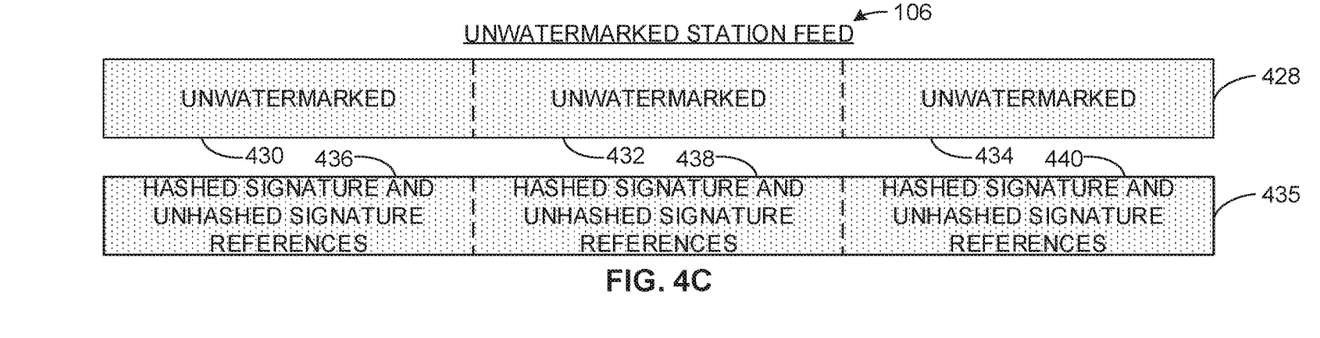

FIG. 4C illustrates an example output of the reference analyzer 118 of FIG. 2 based on input from the example media source feed 106 of FIG. 1. The third media source feed 106 includes an example portion 428. The example portion 428 can be processed by the reference analyzer 118 to generate an example reference 435. The example portion 428 includes an example first media segment 430, an example second media segment 432 and an example third media segment 434 which are associated with an example first reference segment 436, an example second reference segment 438 and an example third reference segment 440, respectively.

In the illustrated example, the portion 428 can be of any suitable length of time. In some examples, the segment generator 304 of FIG. 2 divides the portion 428 into the media segments 430, 432, 434 of an equal predetermined length. For example, if the portion 428 is three minutes long, the segment generator 304 can divide the portion 428 into media segments 430, 432, 434 that are one minute long. In other examples, the portion 428 and media segments 430, 432, 434 can be of any suitable length. In some examples, the media segments 430, 432, 434 can be overlapping. For example, the beginning of the second media segment 432 can overlap with the end of the first media segment 430, etc.

Prior to being analyzed by the reference analyzer 118, the reference generator 108 analyzes the portion 428 of the third media source feed 106. Because the third media source feed 106 is not encoded with watermarks, the reference generator 108 does not create any reference watermarks associated with the portion 428. In some examples, the reference generator 108 processes the portion 428 of the third media source feed 106 to create reference signatures associated with each media segment 430, 432, 434. In some examples, the segment analyzer 306 determines that each of the media segments 430, 432, 434 does not have watermark coverage. Accordingly, because the media segments 430, 432, 434 do not have watermark coverage, the signature hasher 310 hashes the reference signatures associated with each of the media segments 430, 432, 434. In this example, the reference storer 312 generates the reference segments 436, 438, 440 which include the unhashed signature references and the hashed reference signatures associated with the respected media segments 430, 432, 434. In some examples, the reference generator 108 outputs the example reference 435 which includes the reference segments 436, 438, 440 and corresponds to the portion 414.

A flowchart representative of example hardware logic, machine readable instructions, hardware implemented state machines, and/or any combination thereof for implementing the reference analyzer 118 of FIG. 2 is shown in FIG. 4. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example reference analyzer 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The process 500 of FIG. 4 includes block 502. At block 502, the watermark receiver 302 receives watermark references associated with a media source feed. For example, the reference generator 108 can analysis a portion of a media source feed (e.g., the media source feeds 102, 104, 106, etc.) and extracts any encoded watermarks from the portion. In this example, the reference generator 108 can transmit the extracted reference watermarks to the watermark receiver 302. In some examples, if there are no encoded watermarks in the portion, the reference generator 108 does not generate reference signatures. In this example, the watermark receiver 302 does not receive any watermark references associated with the portion.

At block 504, the signature receiver 308 receives signature references associated with the media source feed. For example, the reference generator 108 can analysis a portion of the media source feed (e.g., the media source feeds 102, 104, 106, etc.) and processes the media source feed to create the example signature reference 116. In this example, the reference generator 108 can transmit the generated signature reference 116 to the signature receiver 308. In some examples, the signature receiver 308 can receive the signature reference 116 prior to the watermark receiver 302 receiving the watermark references.

At block 506, the example segment generator 304 time aligns the received references. For example, the segment generator 304 can analyze the received time reference to align the timestamps of the received watermark reference 112 and the received signature references 118. In some examples, the segment generator 304 can determine which time stamps of the media source feed have associated signatures of the signature reference 116 and which timestamps of the media source feed have associated watermarks of the associated watermark references 112.

At block 508, the segment generator 304 evaluates whether a threshold time period has been exceeded. If the time period has not been exceeded, the process 500 returns to block 502. If the threshold time period has been exceeded, the process 500 advances to block 510. For example, if the reference generator 108 does not generate a watermark reference (e.g., the media source feed is not encoded with watermarks, the portion analyzed does not have watermarks, there is an error by the reference generator 108, etc.), the signature receiver 308 can release the reference signatures to the segment analyzer after a threshold amount of time. In some examples, the threshold time period can correspond to a time-shifted viewing period (e.g., a week, etc.). In other examples, the threshold time period can be any suitable length. Additionally or alternatively, the segment generator 304 can release the signature reference 116 when the corresponding watermark reference 112 is received by the watermark receiver 302 (e.g., by omitting the execution of block 508, by setting threshold time period to be zero, etc.). In some examples, if the watermark reference 112 is received prior to the signature reference 116, the execution of block 508 may be omitted. At block 510, the segment generator 304 divides a media source feed into segments. For examples, the segment generator 304 can divide a portion of the media source feed into non-overlapping media segments of time duration (e.g., the portion 400 of FIG. 3 can be divided into media segments 402, 404, 406). In other examples, the segment generator 304 can divide a portion of the media source feed into overlapping media segments. In some examples, the segment generator 304 can divide the portion of the media source feed into media segments of unequal length. In some examples, each generated media segment is associated with at least one of the signature received by the signature receiver 308 during the execution of block 504.

At block 512, the segment analyzer 306 selects a media segment generated by the segment generator 304. For example, the segment analyzer 306 may select a first media segment (e.g., the first media segment 402 of FIG. 4A, etc.) of the media segments (e.g., the media segments 402, 404, 406 associated with the portion 400, etc.).

At block 514, the reference storer 312 stores the unhashed signature references associated with the segment. For example, the reference storer 312 stores the unhashed signature references generated by the reference generator 108.

At block 516, the segment analyzer 306 determines if the segment satisfies a dropout constraint. If the segment satisfies the dropout constraint, the process 500 advances to block 522. If the segment does not satisfy the dropout constraint, the process 500 advances to block 518.

At block 518, the signature hasher 310 hashes fingerprint reference associated with portions of the segment without watermark coverage. For example, the signature hasher 310 can process the unhashed signature associated with the media segment using a hashing algorithm. In some examples, the signature hasher 310 using a private hashing key associated with the audience measurement entity. At block 520, the reference storer 312 stores the hashed signature. For example, the reference storer 312 stores the hashed signature generated by the signature hasher 310.

At block 522, the reference storer 312 stores the watermark reference 112. For example, the reference storer 312 can store watermarks of the watermark references 112 associated with the generated media segment.

At block 524, the reference storer 312 generates monitoring reference from stored reference(s). For example, the reference storer 312 generates the reference media segment based on the stored references associated with that media segment. For example, if the media segment 402 is analyzed, the reference storer 312 generates the reference segment 408. For example, if the media segment 402 is analyzed, the reference storer 312 generates the reference segment 408.

At block 526, the segment generator determines if another segment of the media source feed needs to be analyzed. If another media segment is to be analyzed, the process 500 returns to block 512. If another media segment is not be analyzed, the process 500 ends.

Figure 5:
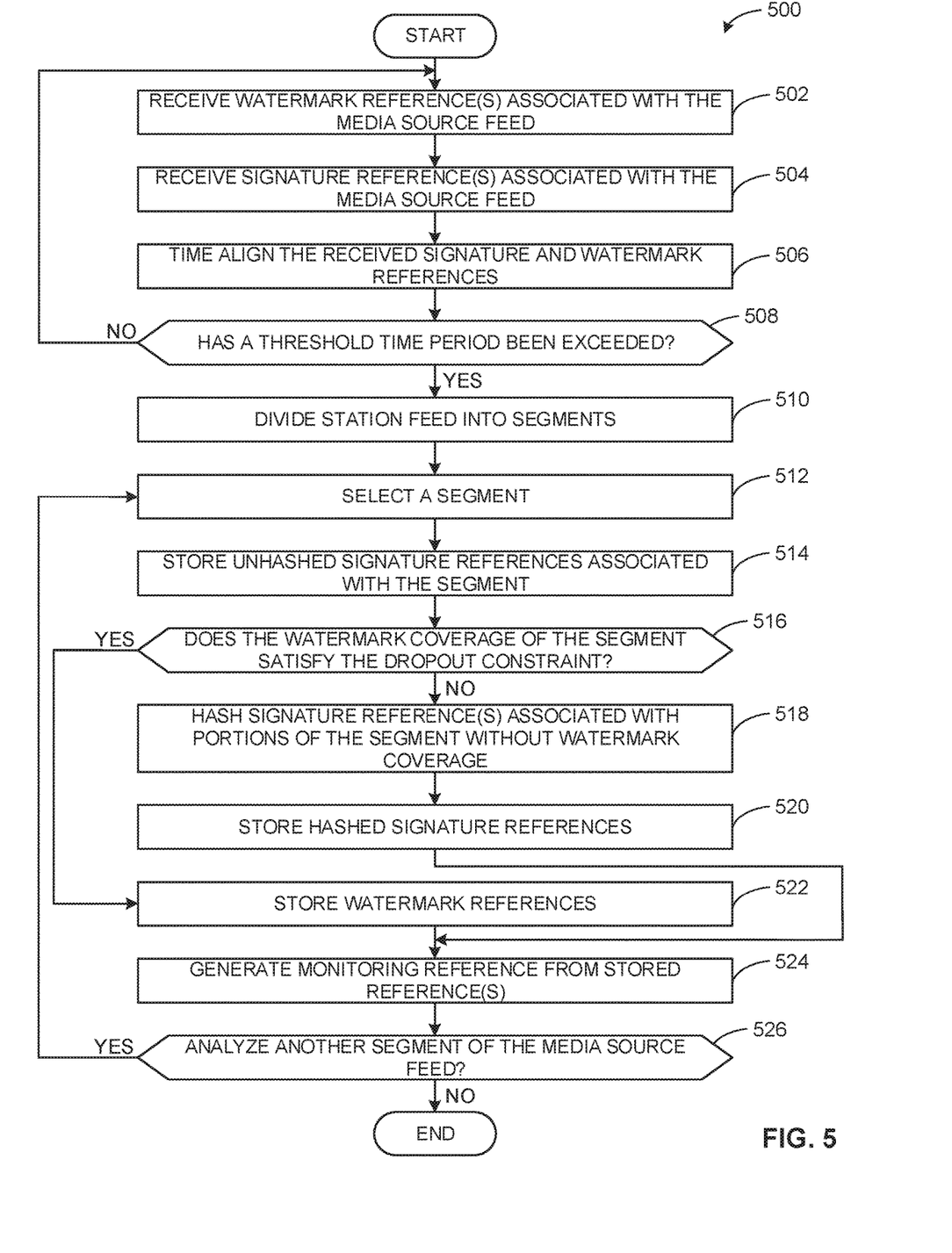
FIG. 5 is a flowchart representative of machine readable instructions which may be executed to implement the reference analyzer of FIG. 2.
Figure 6:
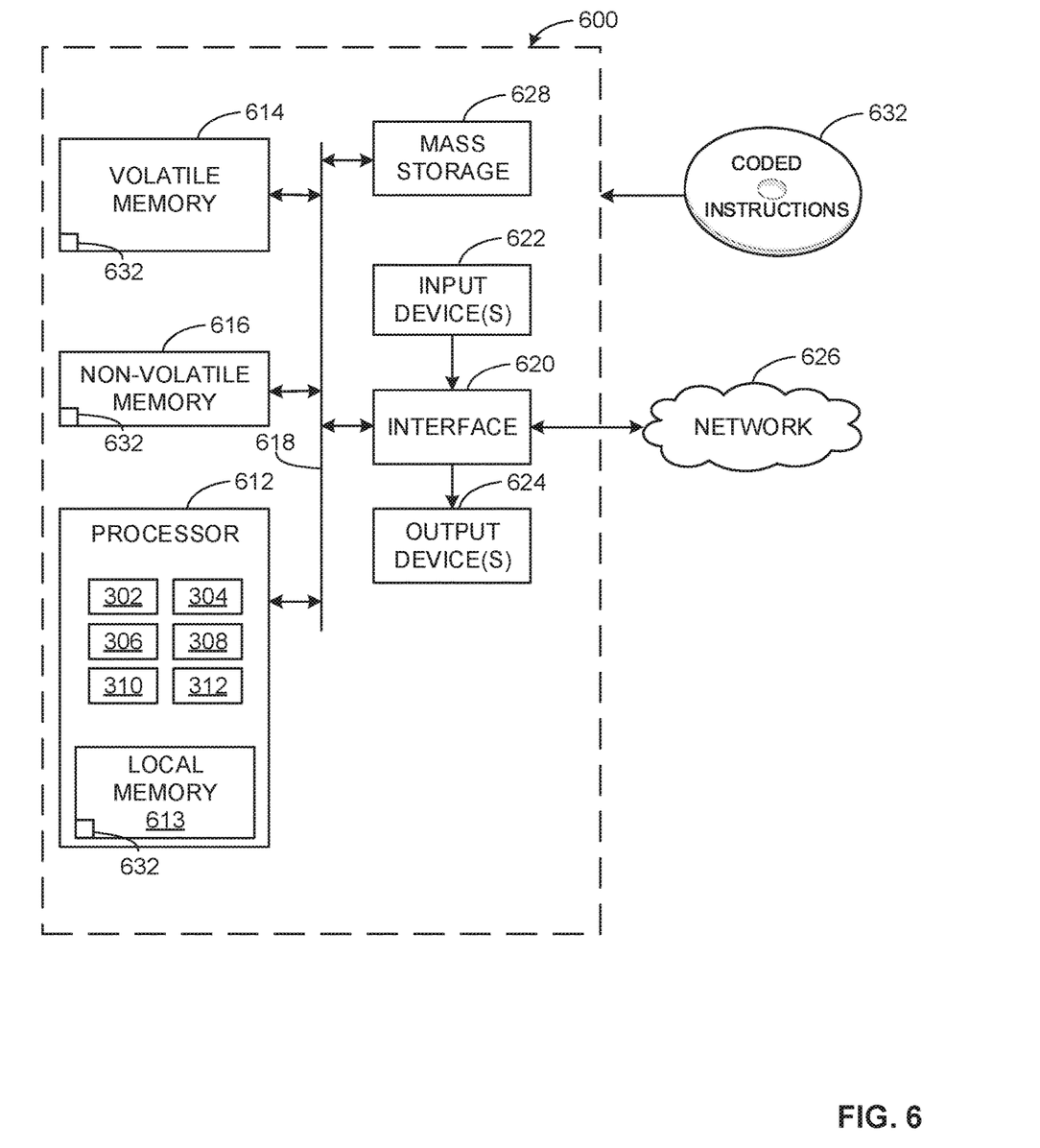
FIG. 6 is a block diagram of an example processing platform structured to execute the instructions of FIG. 5 to implement the reference analyzer of FIG. 3.

FIG. 6 is a block diagram of an example processor platform 600 structured to execute the instructions of FIG. 5 to implement the reference analyzer 118 of FIG. 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example watermark receiver 302, the example segment generator 304, the example segment analyzer 306, the example signature receiver 308, the example signature hasher 310, the example reference storer 312.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 4 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, and articles of manufacture have been disclosed that decrease the computational and storage requirements of media monitoring reference data. The disclosed methods, apparatus and articles of manufacture improve the efficiency of using a computing device by preventing the unnecessary hashing and storage of signatures. For segments of media source feeds with watermark coverage, the computing device can rely upon watermark references and unhashed signature references. Because a significant portion of media source feeds are watermarked, this greatly reduces the processing, bandwidth, and storage required to credit media exposure. Furthermore, the disclosed methods, apparatus and articles of manufacture prevent false crediting of on-demand service viewing caused by relying on hashed signatures. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry;
   machine readable instructions; and
   programmable circuitry to at least one of instantiate or execute the machine readable instructions to:
   obtain reference watermarks associated with a media source feed;
   obtain linear reference signatures associated with the media source feed;
   align timestamps of the reference watermarks and the linear reference signatures;
   select a first media segment from a plurality of media segments of the media source feed, the first media segment corresponding to a first monitoring time interval of the media source feed;
   store ones of the linear reference signatures associated with the first media segment;
   determine whether watermark coverage of the first media segment satisfies a dropout constraint;
   in response to a determination that the dropout constraint is satisfied, store ones of the reference watermarks associated with the first media segment; and
   in response to a determination that the dropout constraint is not satisfied, hash the ones of the linear reference signatures associated with the first media segment to determine hashed reference signatures associated with the first media segment, and store the hashed reference signatures.

2. The apparatus of claim 1, wherein the programmable circuitry is to:
   generate monitoring reference data associated with the first media segment; and
   provide the monitoring reference data to a media monitor that is to credit viewership of the first media segment.

3. The apparatus of claim 2, wherein the monitoring reference data includes at least one of the stored hashed reference signatures or the stored ones of the reference watermarks associated with the first media segment.

4. The apparatus of claim 1, wherein the dropout constraint corresponds to a percentage of the first media segment that does not have watermark coverage.

5. The apparatus of claim 1, wherein the dropout constraint corresponds to a duration of time without watermarks in the first media segment.

6. The apparatus of claim 1, wherein the plurality of media segments are non-overlapping.

7. The apparatus of claim 1, wherein the plurality of media segments are overlapping.

8. At least one non-transitory machine readable storage medium comprising instructions that, when executed, cause programmable circuitry to at least:
   obtain reference watermarks associated with a media source feed;
   obtain linear reference signatures associated with the media source feed;
   align timestamps of the reference watermarks and the linear reference signatures;
   select a first media segment from a plurality of media segments of the media source feed, the first media segment corresponding to a first monitoring time interval of the media source feed;
   store ones of the linear reference signatures associated with the first media segment;
   determine whether watermark coverage of the first media segment satisfies a dropout constraint;
   in response to a determination that the dropout constraint is satisfied, store ones of the reference watermarks associated with the first media segment; and
   in response to a determination that the dropout constraint is not satisfied, hash the ones of the linear reference signatures associated with the first media segment to determine hashed reference signatures associated with the first media segment, and store the hashed reference signatures.

9. The at least one non-transitory machine readable storage medium of claim 8, wherein the instructions cause the programmable circuitry to:
   generate monitoring reference data associated with the first media segment; and
   provide the monitoring reference data to a media monitor that is to credit viewership of the first media segment.

10. The at least one non-transitory machine readable storage medium of claim 9, wherein the monitoring reference data includes at least one of the stored hashed reference signatures or the stored ones of the reference watermarks associated with the first media segment.

11. The at least one non-transitory machine readable storage medium of claim 8, wherein the dropout constraint corresponds to a percentage of the first media segment that does not have watermark coverage.

12. The at least one non-transitory machine readable storage medium of claim 8, wherein the dropout constraint corresponds to a duration of time without watermarks in the first media segment.

13. The at least one non-transitory machine readable storage medium of claim 8, wherein the plurality of media segments are non-overlapping.

14. The at least one non-transitory machine readable storage medium of claim 8, wherein the plurality of media segments are overlapping.

15. A method comprising:
   obtaining, by executing an instruction via at least one processor, reference watermarks associated with a media source feed;
   obtaining, by executing an instruction via the at least one processor, linear reference signatures associated with the media source feed;
   aligning, by executing an instruction via the at least one processor, timestamps of the reference watermarks and the linear reference signatures;
   selecting, by executing an instruction via the at least one processor, a first media segment from a plurality of media segments of the media source feed, the first media segment corresponding to a first monitoring time interval of the media source feed;
   storing, by executing an instruction via the at least one processor, ones of the linear reference signatures associated with the first media segment;
   determining, by executing an instruction via the at least one processor, whether a watermark coverage of the first media segment satisfies a dropout constraint;
   in response to a determination that the dropout constraint is satisfied, storing, by executing an instruction via the at least one processor, ones of the reference watermarks associated with the first media segment; and in response to a determination that the dropout constraint is not satisfied, hashing, by executing an instruction via the at least one processor, the ones of the linear reference signatures associated with the first media segment to determine hashed reference signatures associated with the first media segment and storing the hashed reference signatures.

16. The method of claim 15, further including:

generating monitoring reference data associated with the first media segment; and providing the monitoring reference data to a media monitor that is to credit viewership of the first media segment.

17. The method of claim 16, wherein generating the monitoring reference data includes using at least one of the stored hashed reference signatures or the stored reference watermarks associated with the first media segment.

18. The method of claim 15, wherein determining the dropout constraint includes determining whether a percentage of the first media segment that does not have watermark coverage exceeds a threshold.

19. The method of claim 15, wherein determining the dropout constraint includes determining whether a duration of time without watermarks in the first media segment exceeds a threshold.

20. The method of claim 15, wherein the plurality of media segments are non-overlapping.

21. The method of claim 15, wherein the plurality of media segments are overlapping.

* * * * *